W. A. FENN.
MECHANICAL MOVEMENT.
No. 112,699.  Patented Mar. 14, 1871.
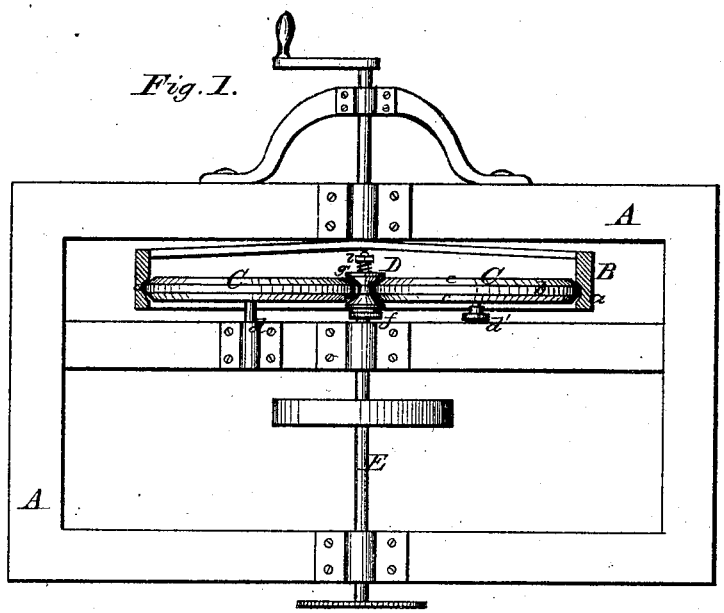
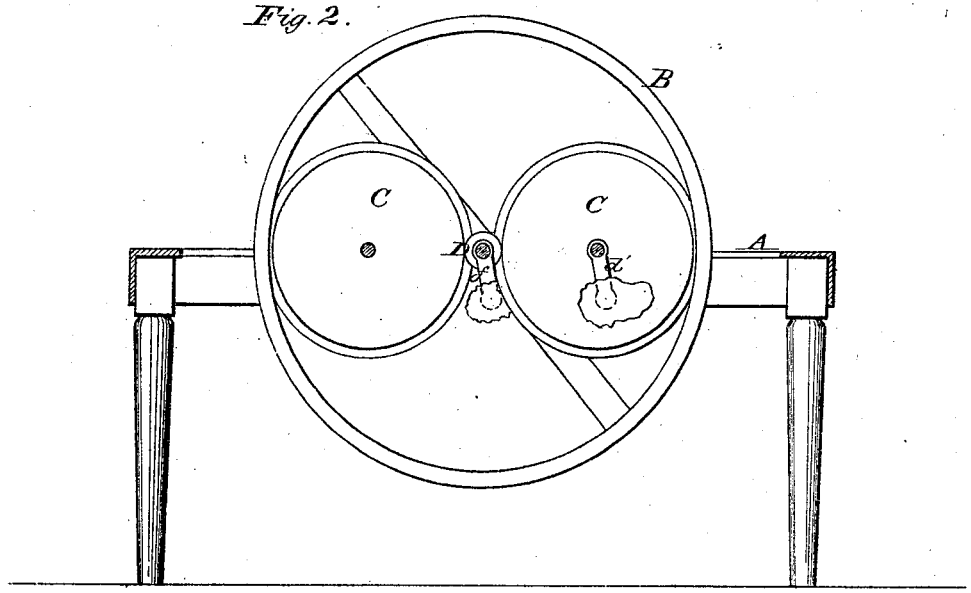
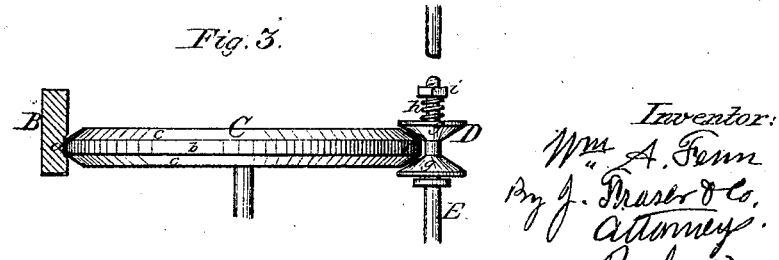

United States Patent Office.

WILLIAM A. FENN, OF ROCHESTER, NEW YORK.

Letters Patent No. 112,699, dated March 14, 1871.

IMPROVEMENT IN MECHANICAL MOVEMENTS.

The Schedule referred to in these Letters Patent and making part of the same.

*To all whom it may concern:*

Be it known that I, WILLIAM A. FENN, of the city of Rochester, county of Monroe and State of New York, have invented a certain new and useful Improvement in Mechanical Powers, of which the following is a specification.

Nature of the Invention.

My invention consists in combining with a system of wheels, inclosed by an outer rim and imparting motion to a central shaft, a divided pulley upon said shaft, which, by tightening up or closing together, produces the friction or engagement by which the motion is attained.

It also consists in the special arrangement of the wheels themselves, as hereinafter described.

General Description.

In the drawing—

Figure 1 is a plan, with the rim in section.
Figure 2, a sectional elevation.
Figure 3, a detail view.

A represents the frame, which may be of ordinary construction.

B is the driving-wheel, which is hung in the frame so as to revolve, being driven by crank, band, or gearing, as may be desired.

This wheel consists simply of an outer rim, having on its inner periphery a square groove, $a$, which constitutes the frictional driving surface.

C C are the interior wheels, which may be two or more.

They are of such diameter as to bear at the outside against the rim of the outer wheel, and on the inside against a pulley, D, which is situated upon the driving-shaft E, from which power is transferred to a saw or any other instrument or machinery.

In order to fit the square surface of groove $a$ the extreme periphery of the wheels is made square, as shown at $b\ b$; and in order to fit the pulley, which is double conical, with the apexes toward each other, the edges are beveled or angular in a corresponding degree, as shown at $c\ c$.

I claim a special advantage in this form of the contact surfaces, as thereby a square surface only bears upon the large wheel, which produces less binding and irregularity, and reduces the friction in leaving the wheel, while an angular surface bears upon the pulley, which is essential to the adjusting or opening and closing of the pulley, as will presently be described.

By this means a perfect engaging and working of the parts are produced, and with the least loss by friction.

One of the interior wheels rests in a fixed bearing or box, $d$, while the other rests in a swinging box, $d'$; or, if desired, both may rest in swinging boxes.

The shaft E of pulley D also rests in a swinging bearing, $f$, at the inner end.

The object of hanging these parts in swinging bearings is to allow the expansion and contraction of the inner wheels, as will be presently described.

One part, $g$, of the pulley is fast to its shaft, while the other part, $g'$, slides endwise upon a square portion, or upon a feather, to prevent its running loose.

A spring, $h$, is placed behind this, with a nut, $i$, to press it up to place. When thus pressed up the angles of the pulley bear firmly upon the angles of the wheels to produce the necessary friction.

By the means above described the wheels may be expanded to bear firmly against the outer rim, and also against the pinion, so that the power may be adjusted exactly to the work to be done. The swinging bearings of the wheel and pinion, before described, are necessary to accomplish this action.

To disengage or remove the parts for repairs or otherwise, the pulley is relaxed by unscrewing the nut.

It will be noticed that, as the power is imparted on both sides of the pulley D, and the latter swings free, no friction can come on its shaft.

Claims.

What I claim, and desire to secure by Letters Patent, is—

1. The divided pulley D, having one-half stationary and the other adjustable on its shaft, when combined with the interior wheels C C, receiving motion from an external source, as herein described.

2. The construction and arrangement of the pinion D, interior wheels C C, and external driving rim B, as herein described, whereby a square contact surface is attained with the outer rim and an angular one with the pinion, as specified.

3. In combination with the interior wheels and pulley, the swinging boxes or bearings $d'\ d'\ f'$, as described.

WM. A. FENN.

Witnesses:
R. F. OSGOOD,
O. P. BARNES.